Nov. 26, 1957 R. LANGHECK 2,814,367
SPRING FOR TELESCOPIC ANTENNAE
Filed Nov. 1, 1954
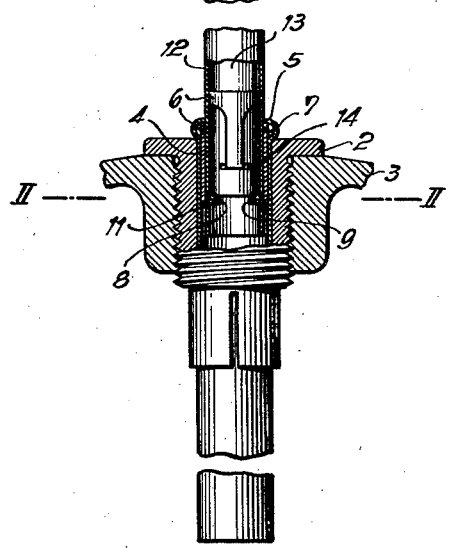
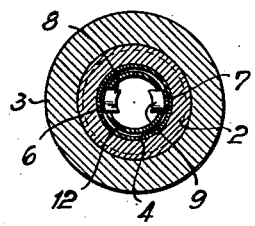
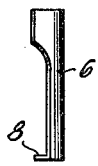
INVENTOR
RICHARD LANGHECK
BY
ATTORNEYS

United States Patent Office 2,814,367
Patented Nov. 26, 1957

2,814,367

SPRING FOR TELESCOPIC ANTENNAE

Richard Langheck, Niefern, Baden, Germany, assignor to the firm Wilhelm Sihn Jr. K.-G., Niefern, Baden, Germany Application November 1, 1954, Serial No. 466,160

2 Claims. (Cl. 189—26)

The present invention relates to telescopic antennae, and is particularly directed to a special type of spring, interposed between the several tubes of the telescopic antenna.

It is already known to the art to provide the expandible tubes of telescopic antennae with springs which rest against the inner wall of the next following outer antenna tube. These springs serve as electric contactors, and as a means to prevent radial movements of the tubes with respect to each other, and, furthermore, as limit stops for the shifting of the expandible antennae parts. For the last mentioned purpose the arrangement is such that the edges of the sheet springs interposed between the tubes rest against a shoulder of the next following outer antenna tube.

It is, also, already known to fasten such sheet springs to the inner tube by means of spot welding. However, the wearing resistance of springs fastened in this way is small, as springy material is unsuited for spot welding. To bend the springs as blades or tongues out of the material of the inner tube is likewise not satisfactory, as the material of the tube is not springy.

It is, further, already known from Patent 2,217,188, issued October 8, 1940 to extend a springy sheet metal strip through oppositely positioned slots in the tube and to bend the projecting ends in such manner that they extend parallel to the axis of the tube. An arrangement like this has the advantage that the portion of the sheet metal strip positioned in the interior of the tube can serve as a stop for the next following inner tube of the telescopic antenna. However, an arrangement of this kind also has the disadvantage that the two flanges of the U-like bent strip may not be of uniform length, in which case the shoulder of the outer tube might rest against only one of the springy flanges.

The invention overcomes all of these deficiencies of known constructions by employing a spring consisting of two separate parts or members. Each of these members projects with a rectangularly bent portion through a transversely extending slot into the interior of the antenna tube. These inwardly projecting portions form, as in known constructions, the stop for the tube positioned still farther toward the center, while the edges of the free outer ends rest against the stop formed by the shoulder of the surrounding outer tube. This pair of springy sheet metal members is thus interposed between two superimposed tubes and is suitably curved to snugly rest against the underlying tube. It is preferred to provide a pair of springy sheet metal members having their lower ends rectangularly inwardly bent and extended through oppositely disposed transverse slots provided in the underlying tube at equal height on the latter, and having their upper ends terminate at equal height of the underlying tube and rest against an annular shoulder provided on the inside wall of the next following outer tube, when the antenna is in expanded condition. Compared with known constructions, this novel construction of the invention has the advantage that the two springy sheet metal members forming the spring, can be mechanically punched and bent, and for that reason can be relied upon to be of exactly uniform length, so that non-uniform seating of the shoulder of the outer tube is thereby reliably prevented.

Through T-like formation of the punched-out sheet metal members, an enlarged abutment for the shoulder of the tube can then be obtained, while the slot which is to receive the rectangularly bent portion may be of comparatively short width.

The invention will be best understood from a consideration of the following detailed description taken in connection with the accompanying drawings, forming a part of this specification and in which an embodiment of the invention has been shown by way of example. However, I wish to say that the invention is not confined to any strict conformity with the showing of the drawings, but may be changed or modified, so long as such changes or modifications mark no material departure from the salient features of the invention as expressed in the appending claims.

In the drawings, in which like parts are referred to by the same reference numerals in all of the several figures, Fig. 1 is a side view, partly in section, showing the arrangement of the spring interposed between the tubes of the telescopic antenna;

Fig. 2 is a cross-section on line II—II of Fig. 1;

Fig. 3 is a front-view of one of the two spring-parts;

Fig. 4 is a side-view of the two spring-parts;

Fig. 5 is a view of one of the two spring-parts from above.

Referring now to the drawings in detail, the reference numeral 2 designates the insert arranged in the car body 3, and out of which the telescopic tubes can be extended. The tube positioned farthest on the outside in the insert 2 and shiftably positioned in the latter is denoted by 4. It is provided with an annular shoulder portion 5, against which abut the upper edges of the two springy sheet metal members 6, 7 illustrated in Figs. 3 to 5. The rectangularly bent lower ends 8, 9 of the springy sheet metal members 6, 7 extend through transverse slots 11 in the inner tube 12 and thus serve as stop for the tube 13, which is positioned still nearer toward the center and likewise provided with slots 14, in which again engage the sheet springs 6, 7.

What I claim as new and desire to secure by Letters Patent of the United States is:

1. In a telescopic antenna the combination with the plurality of superposed telescopic tubes, of a spring consisting of a pair of springy sheet metal members interposed between two superposed tubes and suitably curved to snugly rest against the underlying tube, said pair of springy sheet metal members having their lower ends rectangularly inwardly bent and extended through oppositely disposed transverse slots provided in said underlying tube at equal height of the latter and thus act as stop for the next following inner tube which is above the terminal portion of said bent ends, and having their upper ends terminate at equal height of the underlying tube and resting against an annular shoulder provided at the next following outer tube when said antenna is in expanded condition.

2. A telescopic antenna as specified in claim 1, in which said springy sheet metal members are of T-like formation and so arranged between two superposed tubes that their narrower ends extend through said transverse slots, while their wider ends rest against the annular shoulder provided at the next following outer tube.

References Cited in the file of this patent

UNITED STATES PATENTS

| | | |
|---|---|---|
| 2,179,415 | Mace | Nov. 7, 1939 |
| 2,488,480 | Spirt | Nov. 15, 1949 |
| 2,718,940 | Middleditch | Sept. 27, 1955 |